3,814,790
METHOD OF MAKING MOLDED COMPOSITE
ARTICLES HAVING A COLORED PATTERN
SURFACE
Chuzo Kato and Masashi Kawazoe, Tokyo, Japan, assignors to Dai Nippon Printing Co., Ltd., Tokyo, Japan
No Drawing. Filed June 30, 1972, Ser. No. 268,114
Claims priority, application Japan, July 8, 1971, 46/49,892
Int. Cl. B41m 1/26; B44c 1/24
U.S. Cl. 264—122                                    10 Claims

ABSTRACT OF THE DISCLOSURE

A process for the production of molded composite articles having a colored pattern which comprises molding a composition comprising more than 30% by weight of at least one of powders of non-combustible inorganic materials and less than 70% by weight of at least one of organic binders, contacting the surface of resultant molded composite product with the surface of the pattern layer of a transfer sheet having a colored pattern which is comprised of a sublimable colorant and a vehicle, and subjecting them to a heat-transfer treatment.

The molded composite articles according to the present invention may be used conveniently in the field of construction work and engineering work.

---

The present invention relates to a process for the production of molded composite articles, more particularly relates to a process for the production of molded composite articles composed of a non-combustible inorganic material and an organic binder and having a mono- or multi-colored pattern which is a distinctly colored, exquisite, and delicate pottery-like or marble-like one.

Heretofore, various non-combustible or fire-resistant materials have been proposed in order to strengthen non- or difficult-combustibility of building.

One of these materials is a composite material comprising a non-combustible inorganic material and an organic high molecular compound.

Said composite material is a relatively new material which has been developed for obtaining a material having both desirable properties of an inorganic material and an organic high molecular compound and it can be expectedly used in the field of building materials as a non- or difficult-combustible material.

However, this composite material lacks an appearance necessary to a high class material for building as well as a processability and a flexibility in the case that it is used instead of plastic materials and also it is too expensive.

In order to sufficiently improve the composite material, it has been known to laminate with a decorative paper having a mono- or multi-colored pattern or to print with a mono- or multi-colored pattern directly on the surface of the composite material.

As a result the appearance of the composite material has been improved and also its utility value has been increased.

In the method wherein a decorative paper is laminated on the surface of the composite material, however, there are disadvantages that since the decorative paper is stripped from the surface of the composite material the material cannot be used, and the time required for curing a resin solution coated on the surface of the decorative paper is very long and further the coating process itself is very complicated and troublesome. On the other hand, the method wherein pattern is printed directly on the composite material has disadvantage that the printing of the pattern on said material itself is very difficult and therefore this method is not practical industrially.

It is one object of the present invention to provide a molded composite article having mono- or multi-colored patterns which have not the above-mentioned disadvantages of the prior product.

It is another object of the present invention to provide a molded composite article comprising a non-combustible inorganic material and an organic binder and having a mono- or multi-colored pattern which is a distinctly colored, exquisite and delicate pottery-like or marble-like pattern.

The foregoing objects and other objects as well as the characteristic feature of the invention will become more readily understandable by the following description.

According to the present invention, therefore, we provide a process for the production of molded composite articles having a colored pattern which comprises molding a composition comprising more than 30% by weight of at least one of powders of non-combustible inorganic materials and less than 70% by weight of at least one of organic binders, contacting the surface of resultant molded composite product with the surface of the pattern layer of a transfer sheet having a colored pattern which is comprised of a sublimable colorant and a vehicle, and subjecting them to a heat-transfer treatment.

In the practice of the process of the present invention, more than 30% by weight, preferably 65 to 98% by weight of the non-combustible inorganic material powders are mixed with less than 70% by weight, preferably 35 to 2% by weight of the organic binders.

Then the resultant pasty composition is charged into any mold and maintained at a temperature between about 50° to 250° C. and under a pressure between 1 to 200 atoms./cm.² for about 1 to 10 hours. Then the pressure in the mold is released and the temperature is brought to a room temperature, thereafter a molded composite material having desired shape is withdrawn from the mold.

The non-combustible inorganic materials which may be employed in the process of the present invention are for example at least one of the materials selected from the group consisting of oxides, silicates, carbonates, sulfates and phosphates of iron, aluminium, alkali metal and alkaline earth metal, and may be an artificial or natural materials.

As the typical inorganic materials, there are mentioned the following materials: three-layer structure type clays such as pyrophyllite, talc, montmorillonite type clays, vermiculite and sericite; two layer structure type clays such as kaolinite type clays; fiber structure type clays such as attapulgite; irregular structure type clays such as chlorite type clay, various types of zeolite such as clinoptilolite and mordenite; diatomaceous earth, calcium carbonate, lime, silica, gypsum and the like.

As the prepolymers, there are mentioned prepolymer of methyl methacrylate, prepolymers of phenol-formaldehyde resin, urea-formaldehyde resin, melamine-formaldehyde resin, ketone-formaldehyde resin and the like; prepolymers of unsaturated polyesters, prepolymers of epoxy resins and prepolymers of diallyl phthalate.

As the polymers, there are mentioned the homopolymers or copolymers of aforementioned monomers such as polyvinyl chloride, polyvinylidene chloride, polyvinylacetate, polyolefin such as polyethylene and polypropylene, polystyrene, polyacrylic resin, polyvinyl alcohol, polyvinyl acetal, a copolymer of styrene and acrylonitrile, ABS resin, polyamide resins, unsaturated polyesters, epoxy resins, phenolic resins and amino resins and the like.

As the organic binders which may be employed in the process of the present invention, polymerizable monomers, prepolymers and polymers can be used.

As such monomers, there are mentioned styrene and its derivatives, vinylidene chloride, vinyl pyridine, unsaturated carboxylic acids such as acrylic acid, methacrylic acid, itaconic acid, maleic acid and fumaric acid and derivatives of said acids, for example, methyl, ethyl, propyl and butyl esters, and nitriles and amides of said acids; hydroxyethyl-acrylate and methacrylate, hydroxypropyl-acrylate and methacrylate, vinyl acetate, allyl alcohol and allyl ester thereof, methyl vinyl ketones; acrolein, vinyl carbazole and the like.

Mixtures of these organic binders may be also used in the present invention.

In case monomers or prepolymers are employed as the binder, it is necessary to add a catalyst or accelerator to the pasty composition.

Such catalyst or accelerator may be well known reagents such as for example peroxides, azo compound, disulfides and the like.

The amount of these reagents may be varied from about 0.5 to 1% by weight based upon monomer or prepolymer used.

The composition comprising the inorganic material powder and the organic binder can be further supplemented with fillers or reinforcing materials for example macadams of various type minerals and rocks, a light aggregate, pieces of pottery, glass wool, asbestos, rock wool, pulp, synthetic fibers and the like.

The amount of these materials may be varied from 10 to 70% by weight based upon the inorganic material used.

As mentioned before, the amount of the inorganic materials is more than 30% by weight, preferably about 65 to about 95% by weight and thus the amount of the organic binders is less than 70% by weight, preferably about 35 to about 5% by weight.

When the amount of the inorganic material present in the molded composite product is less than 30% by weight, there is not great difference between the physical properties of the final products according to to the present invention and those of the molded body made of polymer alone and therefore it is difficult to obtain the molded composite articles having an excellent heat resistance, fire resistance and burning resistance which are required as a building material and resulted from a chemical interaction between the inorganic materials and the organic binders. When such molded composite product using less than 30% by weight of the inorganic material is subjected to a heat-transfer process mentioned hereinafter, furthermore, it becomes soft or deteriorates at the heat-transfer temperature. As a result, a pattern formed on the surface of said product is distorted and a desirable final product cannot be obtained.

The function and effect of the inorganic materials which are used in the present invention are as follows:

Montmorillonite type clay, vermiculite and kaolimite type clays such as haloysite and hydrated halloysite have interlayers between their crystals. The fibrous structure type clay, various zealite and diatomaceous earth have three-dimensional cavities. Accordingly, it is presumed that the organic binders mixed with these inorganic materials enter into these interlayers or cavities and combine with intimately the inorganic materials therein to form a composite product having excellent mechanical properties. And also it is presumed that colorants mentioned hereinafter are stabilized so that a decorative pattern having an excellent fastness can be obtained. More concretely, it is presumed that in the before-mentioned molding process, the organic binders are adsorbed by the inorganic materials and they penetrate into the interlayers of the crystal of the inorganic materials and then they react with the inorganic materials to form certain chemical bonding between them, at the same time monomers or prepolymers as a binder being polymerized or condensated thereby a molded composite product having an excellent fire resistance, burning resistance and heat resistance is formed.

It can be deduced that certain chemical bonding is formed between the inorganic powder and the organic binder by the interaction between these two materials, from the diffraction pattern of X-ray, the infrared adsorption spectrum, the differential thermal analysis of the composite product and the increase of the mechanical strength of it.

According to the present invention, the formation of patterns on the surface of the above mentioned molded composite product is carried out by a heat transfer treatment.

This heat transfer treatment comprises contacting the surface of the molded composite product with the surface of the pattern layer of a transfer sheet having a mono- or multi-colored pattern which comprises a sublimable colorant and a vehicle, maintaining a temperature of about 80° to 350° C. under a pressure of about 50 atms./cm.$^2$ using a press for about 30 to 600 seconds, decreasing the temperature and pressure, withdrawing them from the pressure and stripping the transfer sheet from the surface of the molded composite product.

The transfer sheet used in the present invention may be produced by the process which comprises preparing an ink composition containing a colorant which can sublimate or melt, a vehicle and if necessary other additives and forming mono- or multi-colored patterns such as letter, mark, design and the like, on a suitable sheet base with a conventional printing process or drawing process such as a gravure printing, offset printing, relief printing processes and other processes using the above mentioned ink composition.

As the colorants which can sublimate or melt, disperse dyes and oil soluble dyes can be used.

Examples of such dyes are shown in the following.

Sudan III (C.I. Solvent Red 23; C.I. 26100), Sudan G (C.I. Solvent Orange 1; C.I. 11920), Miketon Polyester Yellow GF (C.I. 12690), Sudan Brown (C.I. Solvent Brown 5; C.I. 12020), Sudan Blue II (C.I. Solvent Blue 35), Malachite Green (C.I. Basic Green 4; C.I. 42000), Astra Green Base (C.I. Solvent Green 4; C.I. 42000), Sudan I (C.I. Solvent Yellow 4; C.I. 12055), Resorin Red FB (C.I. Disperse Red 60), Resorin Blue RRL (C.I. Disperse Blue 72), Miketon Fast Yellow G (C.I. 11855), Hiketon Fast Violet BB (C.I. 11200), Sumikaron Yellow 6G (C.I. Disperse Yellow 51), Dianix Fast Orange R-FSM/D (C.I. Disperse Orange 5), Artisil Scarlet G.F.L. (C.I. Disperse Red 43), Phorone Red FL (C.I. Disperse Red 72), Nigrosine (C.I. 50413), Para Blue (Basic dye; C.I. 50410), Victoria Blue F4R (C.I. 42563 B), Astria Blue Base (C.I. Solvent Blue 54), Sudan Red R (C.I. Solvent Red 17; C.I. 12155), 1,5-dihydroxy-4, 8-stearylamino anthraquinone, Calliton Blue G (C.I. Disperse Blue 1; C.I. 64500), Celliton Fast Yellow RR (C.I. 10345), Resorin Blue FBL (C.I. Disperse Blue 56), Latyl Yellow 3G (C.I. Disperse Yellow 54), Latyl Violet 2R (C.I. Disperse Violet 18), Duranol Violet 2R (C.I. Disperse Violet 1; C.I. 61100) and Artisil Direct Yellow RGFL (C.I. Disperse Yellow 36).

It is preferable that the above-mentioned colorant have a melting point or sublimating point ranging from about 80° to 300° C.

It is necessary to use a vehicle of which melting point is higher than the melting point or sublimating point of the colorant and it is not preferable to use a vehicle which softens or melts at the temperature and under the pressure at the heat transfer treatment.

As such vehicle, synthetic resins such as polyvinyl chloride, polyvinyl alcohol, polyvinyl acetal, acrylic resins, cellulose derivatives, polycarbonates, polyamides and polyesters can be used.

Additives which are optionally added to the ink composition may be a plasticizer, wax, grease, dryer, assistant dryer, surfactant active agent, filler and others.

The sheet base used to prepare the transfer sheet may be for example various papers and converted paper, a film or sheet material of synthetic resins, a metal foil such as aluminium foil and a laminated film made from these materials with a conventional laminating process.

According to the present invention, the following effects can be obtained.

(1) A prior molded composite article composed of inorganic material and organic material, particularly one having a high content of an inorganic material has not been almost used as a building material or a material for an interior furniture.

According to the present invention, a distinctly colored and delicate pottery-like or marble-like pattern can be formed very easily on the surface of the molded composite product and therefore the resultant product can be utilized as a high class building material and an interior furniture material.

It is supposed that the inorganic material in the composite product contributes to the formation of the very clear, delicate pottery-like or marble-like pattern; that is, if a molded product is composed of an organic high molecular compound only or if the amount of the inorganic material in said product is very low, the colorant composing a pattern is diffused, as a result the pattern produced on the product becomes unclear on the contrary when a molded product contains more than 30% by weight of the inorganic material, the colorant penetrates into the cavities of the crystal layer or the structure of the inorganic material and prevents the colorant from diffusion thereby the clear pattern can be obtained.

(2) The pattern produced on the surface of the molded composite product according to the present invention has a good heat resistance, hot-water resistance and weather resistance.

It is presumed that the colorant penetrates into the structure of the inorganic material thereby it is stabilized thermally and at the same time the colorant which does not penetrate into the structure of the inorganic material is hydrogen-bonded with hydroxy group or oxygen atom present on the surface of the inorganic material thereby the increased fastness as regard the above-mentioned properties are obtained as compared with those of a molded product in which lesser amount of the inorganic material is present or the inorganic material is absent.

Further, the properties such as a heat resistance, hot-water resistance, weather resistance, abrasion resistance and surface gloss of the pottery-like or marble-like pattern can be increased by the top-coating of a suitable resin on the surface of the pattern.

(3) The pottery-like or marble-like pattern is not only formed on the surface of the molded composite product but also the colorant forming the pattern penetrates into the substantial interior of the product therefore the pattern does not disappear or become unclear even if the surface of the pattern is wiped with a solvent which can dissolve the colorant. This is one reason that the pattern exhibits a good abrasion resistance and heat resistance.

(4) The molded composite article having a distinctly colored and delicate pattern can be obtained without using any complicated apparatus in a short time.

That is, only a mold for the production of a molded product and a suitable apparatus for a heating and pressuring are necessary in the present invention.

(5) According to the present invention, the pattern can be formed not only on a smooth surface but also a surface having many hollows. This is due to the sublimation characteristics of the colorant used in the present invention.

The molded composite articles according to the present invention can be used as a building material for wall, floor, ceiling and others, a material for furnitures and a building material for the outer part of the building.

The present invention is illustrated by the following examples. Of course, the present invention is not limited thereto.

EXAMPLE 1

100 parts of commercially available bentonite are mixed sufficiently with 200 parts of methyl methacrylate and 1.0% by weight of azobisisobutyronitrile based upon methylmethacrylate used to obtain a uniform pasty composition.

Then the resulant pasty composition is charged into a mold by which a molded product in plate form can be formed and is maintained at the temperature of about 80° C. and under the pressure of 50 atms./cm.$^2$ for 3–5 hrs. to polymerize the methylmethacrylate completely. Thereafter the pressure and temperature are lowered and the mold is taken off to obtain a molded composite product in plate form.

On the other hand, 15 parts of Sudan G, 8 parts of ethyl cellulose N7 and 23 parts of a mixture of toluol and butanol (1:1) are blended and milled together to prepare an ink composition. Then, using resultant ink composition, a multi-colored pattern having an abstract design is printed on a top coat paper with a gravure printing process to obtain a transfer sheet.

The resultant transfer sheet is superposed on the before mentioned molded composite product in plate form in such a manner that the pattern layer of the sheet is contacted with the surface of the composite product then they are interposed between the two press plates of a press and maintained at a temperature of 180° C. to 220° C. under the lower pressure than 50 atms./cm.$^2$ during 60 to 180 seconds. Thereafter they are taken out from the press and the transfer sheet is taken off from the composite product to obtain a molded composite article having a multi-colored pattern which is a distinctly colored and delicate pottery-like or marble-like abstract design pattern.

EXAMPLE 2

700 parts of commercially available Japanese acid clay (montmorillonite) are mixed sufficiently with 300 parts of unsaturated polyester solution, 1.0% by weight of methyl ethyl ketone peroxide based upon unsaturated polyester used and small quantity of cobalt naphthenate to obtain a uniform pasty composition.

Then the resultant pasty composition is charged into a mold by which a molded product in plate form can be formed and is maintained at the normal temperature under the pressure of 50–150 atms./cm.$^2$ for 1–3 hrs. and further at a temperature of 80°–100° C. under the same pressure as the above mentioned during 3 hours. Then the pressure and temperature are lowered and the mold is taken off to obtain a molded composite product in plate form.

On the other hand, 20 parts of Kayaset Blue-776 [manufactured by Nippon Kayaku Kogyo K.K.], 60 parts of rosin-modified phenol resin varnish, 10 parts of zinc white 7 parts of No. 7, linseed oil and 3 parts of wax compound are mixed together sufficiently and milled them to prepare an ink composition. Then, using resultant ink composition, a multi-colored pattern having an abstract design is printed on a top coat paper with an offset printing process to obtain a transfer sheet.

A heat transfer treatment is carried out by the same manner as described in Example 1 to obtain a molded composite article having a multi-colored pattern.

EXAMPLE 3

400 parts of commercially available diatomaceous earth is mixed with 200 parts of polyethylene on a roll mill at the temperature of 150° C. for 30 minutes.

Then the resultant pasty composition is charged into a mold and is maintained at the temperature of about 150° C. under the pressure of 50 atsm./cm.$^2$ for 10 minutes. Thereafter the pressure and temperature are lowered and the mold is taken off to obtain a molded composite product in a plate form.

On the other hand, 15 parts of Resorin Blue RRL, 8 parts of ethyl cellulose N7 and 23 parts of a mixture of toluol and butanol (1:1) are blended and milled to prepare an ink composition. Then, using resultant ink composition, a multi-colored pattern having an abstract design is printed on a top coat paper with a gravure printing process to obtain a transfer sheet.

A heat transfer treatment is carried out by the same manner as described in Example 1 to obtain a molded composite article having a multi-colored pattern.

EXAMPLES 4–14

The same processes as described in Example 1 are repeated except that as raw materials, those shown in Table 1 are employed.

TABLE 1

Composition of composite product

| Ex. No. | Ingredients | Content of inorg. material (percent) | Colorant |
|---|---|---|---|
| 4 | Acid clay, styrene | 80 | Sudan Brown. |
| 5 | Lime powder, epoxy resin | 90 | Astra Green base. |
| 6 | Lime powder, unsaturated polyester resin | 65 | Resorin Red FBE. |
| 7 | Diatomaceous earth, methyl methacrylate | 80 | Sudan III. |
| 8 | Zeolite methyl methacrylate | 70 | Celliton Blue G. |
| 9 | Acid clay, glass fiber, unsaturated polyester resin | 95 | Resorin Blue RRL. |
| 10 | Lime powder, epoxy resin | 90 | Miketon Polyester Yellow GF. |
| 11 | Lime powder, unsaturated polyester resin | 80 | Miketon Polyester Yellow GF, Resorin Red FBE, Resorin Blue RRL. |
| 12 | Phenol resin gypsum | 65 | Sudan G. |
| 13 | Urea resin attapulgite | 70 | Victoria Blue G. |
| 14 | Melamine resin clinoptilolite | 70 | Sudan G. |
| 15 | Kaolinite polyethylene | 30 | Victoria Blue 4R. |

In order to examine the relation between the degree of the formation of pattern and the content of an inorganic material when a heat transfer time is varied, Example 2 is repeated at the different amounts of acid clay and the different heat transfer times.

Table 2 shows the results obtained.

It can be seen that the formation of the pattern is good when the content of acid clay is more than 60%.

TABLE 2

| Content of acid clay (percent) | Heat transfer time (minutes) | | | |
|---|---|---|---|---|
| | 0.5 | 1 | 2 | 3 |
| 0 | X | Δ | O | O |
| 30 | Δ | O | O | O |
| 30 | Δ | O | O | O |
| 90 | Δ | O | O | O |

Note.—X=very poor; Δ=poor; O=good.

In order to examine the relation between the degree of the penetration of a colorant into the molded composite product and a heat transfer time, Example 1 is repeated at the different heat transfer times.

The results obtained are shown in Table III.

From Table 3, it is noted that the colorant penetrates into the considerable interior of the molded composite product.

TABLE 3

| Heat transfer time (sec.) | Thickness of the layer penetrated by colorant (mm.) |
|---|---|
| 30 | 0.04 |
| 60 | 0.09 |
| 180 | 0.24 |
| 360 | 0.45 |

Table 4 shows the solvent resistance of the pattern obtained in Example 2. It is apparent from Table 4 that the colorant bleeds in some case but the pattern itself is unchanged, it can be seen, therefore, that the solvent resistance of the pattern is very good.

TABLE 4

| Solvent | Solvent resistance |
|---|---|
| Hexane | Unchange. |
| Benzene | do. |
| Acetone | Colorant bleeds, pattern is unchanged. |

Table 5 shows the data of the heat resistance of the patterns of the molded composite articles which are obtained by repeating Example 6 at different amounts of lime powder, at 100° C.

It can be seen from Table 5 that the heat resistance of the pattern becomes better as the amount of lime powder is increased, therefore the lime powder contributes to the heat resistance of the pattern.

TABLE 5

| Contents of lime powder (percent) | Heating time (hours) | | |
|---|---|---|---|
| | 20 | 40 | 80 |
| 0 | Unchange | Slightly fade | Fading proceed. |
| 10 | do | do | Do. |
| 30 | do | do | Slightly fade. |
| 60 | do | Unchange | Do. |
| 90 | do | do | Unchange. |

Table 6 shows the data of the weather resistance of each of three colorants which are used in Example 11 measured by a Weather-Ometer. In order to carry out this test, the molded composite article which is heat transferred by one of these colorants, is prepared, and is then subjected to the test with a Weather-Ometer.

It is apparent from Table 6 that the weather resistances of these colorants are generally very good and it can be seen, therefore that the weather resistance of the pattern which is obtained by the use of these colorants is very good.

TABLE 6

| Colorant | Time of test (hours) | | |
|---|---|---|---|
| | 40 | 80 | 150 |
| Resorin Red FBE | Unchange | Unchange | Unchange. |
| Miketon Polyester yellow GF | do | do | Slightly fade. |
| Resorin Blue RRL | do | do | Fading proceeds. |

What we claim is:

1. A process for the production of molded composite articles having a colored pattern comprising:
   providing a pasty composition having 65 to 98% by weight of at least one powdered non-combustible inorganic material and 35 to 2.0% by weight of at least one organic binder,
   charging said pasty composition into a mold,
   heating and pressing said charged pasty composition in the mold in order to form a molded composite product,
   removing said composite product from the mold,
   contacting the surface of the molded composite product with the surface of a patterned layer of a heat transfer printing sheet having a colored pattern comprising a sublimable dye and a vehicle, heating the composite product with the transfer printing sheet thereon under pressure to transfer by sublimation only the sublimable dye in the colored pattern of said heat transfer printing sheet into and below the surface of said molded composite product, and stripping the heat transfer printing sheet from the molded composite product to form a colored pattern into and below the surface of said molded composite product.

2. A process as claimed in claim 1 including, heating said charged pasty composition in the mold at a temperature of 50° to 250° C. under a pressure of 1 to 200 atm./cm.$^2$ for 1 to 10 hours to form a molded composite product.

3. The process of claim 1 including:
heating the composite product with the transfer printing sheet thereon at a temperature of 80° to 350° C. under pressure for 30 to 600 seconds.

4. The process of claim 2 wherein said pressure to transfer said printing sheet is about 50 atm./cm.$^2$.

5. A process as claimed in claim 1 wherein the noncombustible inorganic material is one belonging to the group consisting of three-layer structure type clays including pyrophyllite, talc, montomorillonite type clays, vermiculite and sericite two-layer structure type clays in cluding kaolinite type clays, fiber structure type clays including attapulgite, irregular structure type clays including chlorite type clay, zeolites including clinoptilolite and mordenite, diatomaceous earth and gypsum.

6. A process as claimed in claim 1 wherein the organic binder is one belonging to the group consisting of polymethyl methacrylate, polyethylene, polystyrene, unsaturated polyester, eopxy resin, phenol resin and melamine resin.

7. A process as claimed in claim 1 including:
heating said charged pasty composition in the mold at a temperature of 50° to 250° C. under a pressure of 1 to 200 atm./cm.$^2$ for 1 to 10 hours to form a molded composite product, and
heating the composite product with the transfer printing sheet thereon at a temperature of 80° to 350° C. under pressure for 30 to 600 seconds.

8. A process as claimed in claim 1 wherein the colorant is selected from the group consisting of disperse dyes and oil soluble dyes which can sublimate.

9. A process as claimed in claim 1 wherein the noncombustible inorganic material is Japanese acid clay, and the organic binder being unsaturated polyester.

10. A process as claimed in claim 1 wherein the noncombustible inorganic material is gypsum and the organic binder being phenolic resins.

References Cited
UNITED STATES PATENTS

| | | | |
|---|---|---|---|
| 3,670,063 | 6/1972 | Scheuler | 64—122 X |
| 2,721,821 | 10/1955 | Hoover | 117—3.2 X |
| 2,235,514 | 3/1941 | Brown | 117—3.4 |
| 2,404,073 | 7/1946 | Karfiol et al. | 117—3.4 |
| 3,067,054 | 12/1962 | Reese | 117—3.4 |

PHILIP DIER, Primary Examiner

U.S. Cl. X.R.

117—3.2, 3.4; 161—413; 156—240; 264—132